United States Patent [19]

Wieser

[11] 4,334,851

[45] Jun. 15, 1982

[54] CONCRETE FORMING APPARATUS

[76] Inventor: Joseph H. Wieser, Rte. 2, Maiden Rock, Wis. 54750

[21] Appl. No.: 188,432

[22] Filed: Sep. 19, 1980

Related U.S. Application Data

[63] Continuation of Ser. No. 11,316, Feb. 12, 1979, abandoned.

[51] Int. Cl.³ ........................... B28B 7/00; B29C 1/16

[52] U.S. Cl. .................................... 425/412; 264/253; 425/424; 425/432

[58] Field of Search ................ 264/256, 333; 425/125, 425/254, 255, 253, 351, 424, 451.9, 452, 453, 256, 406, 412, 415, 432, 456, 457

[56] References Cited

U.S. PATENT DOCUMENTS

| | | | |
|---|---|---|---|
| 2,875,499 | 3/1959 | Ross | 425/253 |
| 2,985,935 | 5/1961 | Wellnitz | 425/432 |
| 3,129,462 | 4/1964 | Borah | 425/351 |
| 3,277,551 | 10/1966 | Sekiguchi | 425/253 |
| 3,590,446 | 6/1967 | Sonneville | 425/125 |
| 4,005,972 | 2/1977 | Sommers | 425/439 |
| 4,009,983 | 3/1977 | Jacobs | 425/451.2 |
| 4,025,265 | 5/1977 | Auer | 425/211 |
| 4,105,382 | 8/1978 | Auer et al. | 425/88 |
| 4,238,177 | 12/1980 | Crile et al. | 425/424 |

FOREIGN PATENT DOCUMENTS

| | | | |
|---|---|---|---|
| 664586 | 6/1963 | Canada | 264/256 |

*Primary Examiner*—Willard E. Hoag

*Attorney, Agent, or Firm*—Merchant, Gould, Smith, Edell, Welter & Schmidt

[57] ABSTRACT

A concrete forming apparatus comprises a support table for holding a pallet in a generally horizontal orientation. A vertically movable mold table engages the pallet to place a mold carried in the mold table on top of the pallet. A dispensing hopper fills the mold with concrete. A vertically movable platen then engages the mold to contact and compact the concrete therein. The platen includes a plurality of air cylinders for securely holding the mold to the pallet during the concrete compaction process.

1 Claim, 7 Drawing Figures

FIG. 3
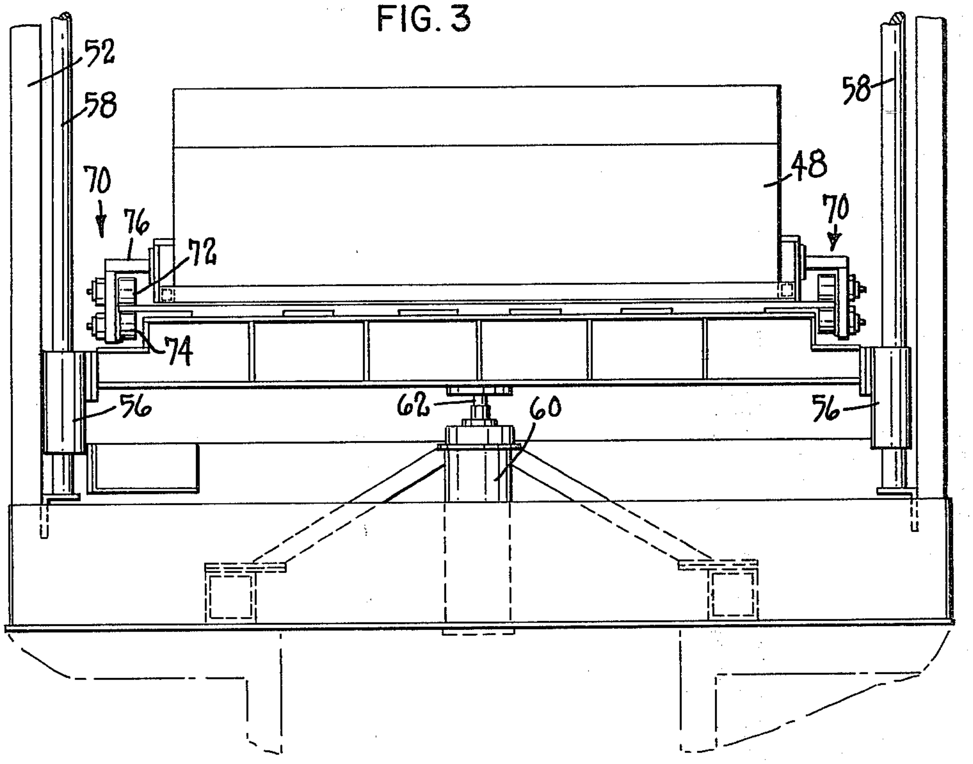
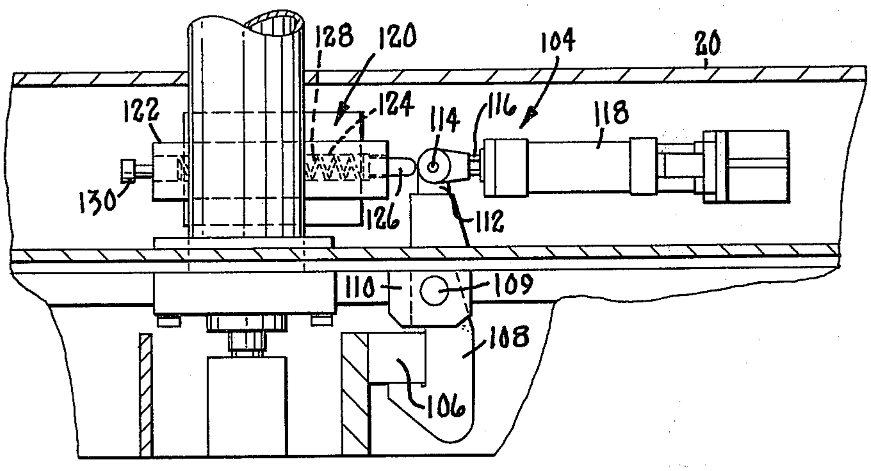
FIG. 4

CONCRETE FORMING APPARATUS

This is a continuation, of application Ser. No. 11,316, filed Feb. 12, 1979, and now abandoned.

TECHNICAL FIELD

This invention relates generally to an apparatus for forming concrete products according to a dry cast process. More particularly, this invention relates to a concrete forming machine or apparatus which is semi-automated and which economically produces various pre-cast concrete products.

DESCRIPTION OF THE PRIOR ART

Various pre-cast concrete products are increasingly used in different areas of the agricultural industry. For example, the assignee of the present invention has made various types of pre-cast slatted floors for use in barns or other animal buildings or enclosures. These floors are usually made from a plurality of pre-cast concrete panels. Each panel usually includes a plurality of longitudinally spaced slats. The slats are spaced apart sufficiently far to allow animal refuse or the like to drop therethrough.

Concrete is in some respects an ideal material for use in animal enclosures. For one thing, it is impervious to the acids and other corrosive agents often contained in animal refuse. In addition, a certain amount of design flexibility is engendered when making a floor from a plurality of pre-cast panels. This flexibility arises because the panels can be cut to accommodate odd dimension lay-outs. Furthermore, other parts of the animal enclosures, such as animal containing stalls or fences, can also be made using pre-cast concrete panels.

One method of manufacturing pre-cast concrete panels would be to pour wet concrete into a suitable mold and let that concrete dry or cure. The mold could then be stripped and the formed concrete panel removed. In this so-called wet-cast system of concrete forming, it is apparent that many different molds would be required if any sizable production of pre-cast panels is to be achieved. This is because the curing time for each panel can be quite long. Therefore, if a large number of panels are to be made in any given time period, it requires that a great many molds be on hand. This can greatly increase the capital investment costs for the manufacturer of the panels. In addition, the large number of molds which are required are difficult to handle and store, further requiring a large storage space. It is known that various concrete products can be formed using a dry-cast process as opposed to the wet-cast process. In the dry-cast process of concrete forming very little water is used in the concrete mix when compared with the amount of water used in the wet-cast process. This means that the concrete will not bind together without utilizing some mechanical force for achieving the bond. However, assuming that this mechanical force is used, the dry-cast concrete method enables one to make a concrete product using less cement. However, the products made according to this process will have the same strength as products made according to the wet-cast process.

A machine or apparatus is usually needed to form concrete panels or the like according to the dry-cast process because of the need to impart pressure to the concrete. In one such machine known to Applicant, a mold is filled with concrete from a suitable dispensing hopper. A vertically movable press head or platen engages the mold and applies pressure to the concrete therein to compact the concrete and cause it to bind together. After this compaction process is repeated a number of times, during each of which mold can also be mechanically vibrated, a concrete panel is formed. This panel can then be stripped from the mold and will have sufficient rigidity to allow the panel to be further handled and stored. In addition to the need for less concrete, this dry-cast system has the advantage of needing only one mold which can be re-used a great number of times for forming plural units of a particular concrete product. The necessity for a large number of molds is therefore obviated.

While the above-mentioned apparatus is generally effective for forming concrete products, a certain number of disadvantages are sometimes associated with its operation. For one thing, the platen is vertically moved by three hydraulic or pneumatic cylinders which are located along the center line of the platen. However, this arrangement sometimes does not prevent the mold from moving upwardly especially when the mold is vibrated during the compacting process. Whenever the mold moves during the concrete forming process, the potential bond of the concrete is somewhat weakened. This movement of the mold therefore can contribute to the creation of areas in the finished product having varying strength. This is disadvantageous since these areas are separated by lines or zones along which the product may be prone to fracture.

The dispensing hopper for the mold has conventionally been operated by means of a rack and pinion engagement. However, the rack has usually been located on an exterior surface of the mold structure. This surface is susceptible to concrete contamination. In other words, it has been found that bits and pieces of concrete can become lodged in the rack. This concrete then jams the hopper as the hopper trys to move along the rack.

Finally, the vertically movable platen has conventionally been provided with a locking arrangement for holding the platen in an upper position above the mold. This locking arrangement is needed as a safety element since it is sometimes necessary for workmen to work underneath the platen to clean the mold or the mold table. The locking feature ensures that the platen will not drop and crush the workmen. However, if the locking mechanism should for any reason fail, there is a possibility that a workmen could be seriously injured or killed. Thus, there is always a need for further increasing the safety of this locking feature.

SUMMARY OF THE INVENTION

Accordingly, it is an aspect of this invention to provide a concrete forming machine or apparatus for forming pre-cast concrete panels according to a dry-cast system which obviates some of the above-noted disadvantages of the prior art.

The concrete forming apparatus according to this invention includes a support frame for supporting a pallet in a substantially horizontal orientation. A vertically movable mold table can be lowered until a mold which is carried therein engages the pallet. A transversely movable dispensing hopper reciprocates across the mold table to fill the mold with concrete. The hopper is supported by opposed roller support pairs and is driven by a rack and pinion engagement located on the underside of the support table. A vertically movable platen can engage the mold for applying pressure to the concrete therein to compact the concrete. In addition to the means for vertically moving the platen, the platen includes a plurality of air cylinders distributed around the area thereof. The pistons of these cylinders engage the mold to hold the mold securely against the pallet during the compaction process. Furthermore, the locking system for the platen includes a lock spring which always forces the locking system into an operative locking condition for failsafe locking of the platen. Thus, the platen is always maintained in an upper locked position when the locking system is engaged.

BRIEF DESCRIPTION OF THE DRAWINGS

This invention will be described hereafter, in conjunction with the following drawings, in which like reference numerals will refer to like elements throughout the several views.

FIG. 3 is a front elevational view of the concrete filling means for the mold used in the machine of FIGS. 1 and 2, particularly illustrating the roller support and drive means for the dispensing hopper;

FIG. 4 is a partial cross-sectional view of the top of the platen of the machine of FIG. 1, particularly illustrating the locking means for locking the platen in an upper raised position;

DETAILED DESCRIPTION

Figure 7:
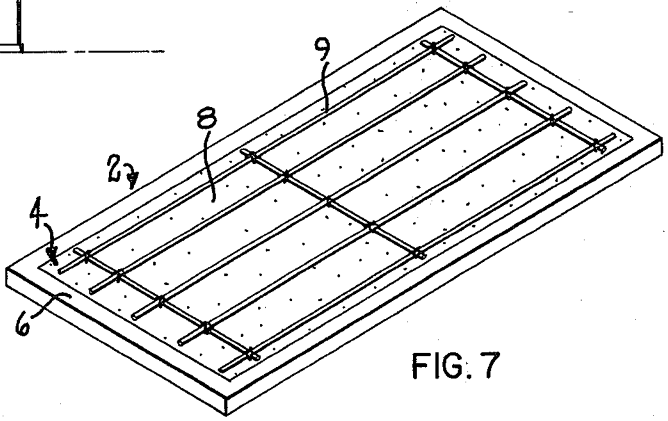
FIG. 7 is a perspective view of a pallet which is used in the concrete forming machine of FIG. 1.

Referring first to FIG. 7, a pallet or concrete product support member, which is used in the concrete forming apparatus or machine 10 of this invention, is illustrated as 2. Pallet 2 is generally rectangular and planar having a flat upper support surface 4. Pallet 2 may be made of any conventional materials. However, it is preferred that the pallet have an exterior steel frame 6 and an interior core 8. Core 8 includes a plurality of steel reinforcing bars (not shown) and further comprises a steel fiber reinforced concrete which is poured around the bars. A plurality of the pallets 2 are used in conjunction with the concrete forming machine 10 according to this invention. Any suitable conveying apparatus, such as roller conveyors, belt conveyors, or the like, can be used to bring the pallets 2 to and from the machine 10. In addition, each pallet 2 can have an array of steel reinforcing bars placed over its upper support surface 4. This array is indicated as 9 in FIG. 7 and corresponds generally to the shape of the concrete product which is being formed on the machine. For example, when the concrete product is a slatted concrete floor panel, each of the reinforcing bars 9 will run along one of the slats of the panel.

Figure 1:
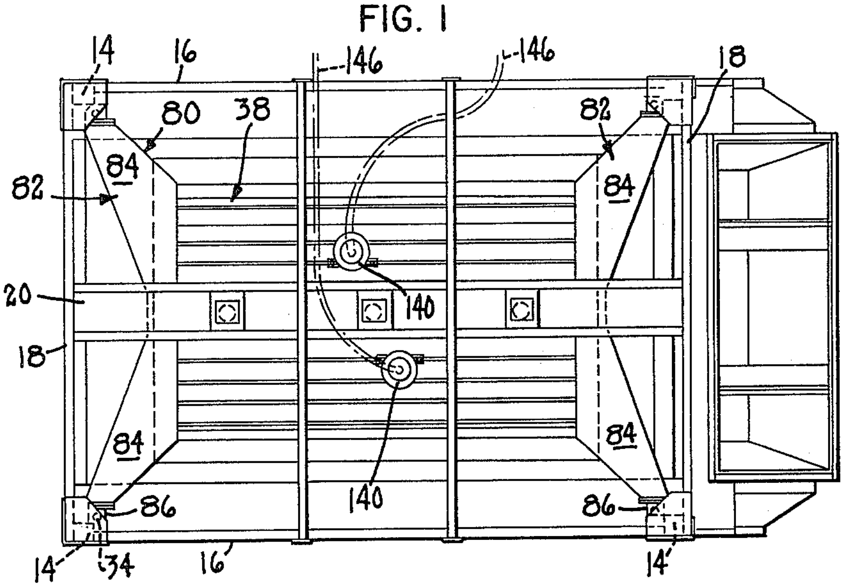
FIG. 1 is a top plan view of an improved concrete forming machine according to this invention.
Figure 2:
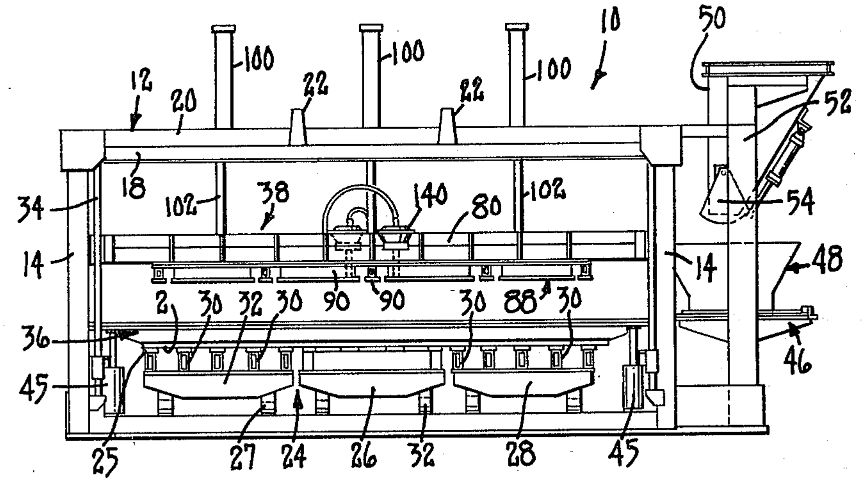
FIG. 2 is a front elevational view of the improved concrete forming machine shown in FIG. 1.

Referring now to FIGS. 1 and 2, the concrete forming machine or apparatus 10 includes a rigid exterior frame 12. The exterior frame 12 includes four vertically extending corner posts or uprights 14. The uprights 14 are connected together at their top ends by two laterally extending beams 16 and two longitudinally extending side beams 18. In addition, side beams 18 have a laterally extending cross beam or cross piece 20 affixed thereto. Cross beam 20 may comprise a suitable U-shaped channel iron or the like. In addition to the structural parts noted, the exterior frame 12 can also include other braces and connecting cross pieces if so desired. For example, note cross pieces 22 extending between beams 16 and across cross beam 20.

The concrete forming apparatus 10 includes a support frame or vibrator table generally indicated as 24. Support frame 24 defines a substantially planar horizontal support surface 25 on which a single pallet 2 is designed to rest. Support frame 24 includes three sections: a middle frame section 16 and left and right hand frame sections 27 and 28 respectively. Each of the sections 26–28 has a plurality of longitudinally extending beams 30, the tops of which are coplanar and define the support surface 25. Each of the sections 26–28 is movably mounted on the exterior frame 12 by any suitable mounting structure 32. In addition, each of the three frame sections 26–28 has a suitable vibrating apparatus (not shown) connected thereto for vibrating these sections in a small vibratory motion. This vibration is for the purpose of vibrating the pallet 2 which is supported on support frame 24.

The exterior frame 12 also includes four vertically extending rods or posts generally indicated as 34. Each of the posts 34 is adjacent one of the corner beams or posts 14. A movable mold table generally indicated as 36 is slidably journaled on the rods 34. In addition, a vertically movable platen or press head, which is generally indicated as 38, is also slidably mounted on the rods 34.

Figure 6:
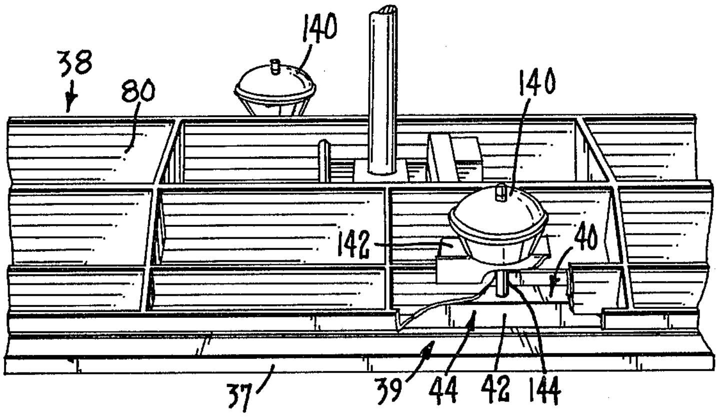
FIG. 6 is a partial perspective view of a portion of the concrete forming machine of FIG. 1, particularly illustrating some auxiliary air cylinders for holding the mold down into engagement with the concrete product supporting pallet.

Referring to FIGS. 2 and 6, the mold table 36 includes a generally rectangular frame 37 having an open rectangular central opening 39. A suitable mold 40 is releasably coupled in opening 39 and held therein for movement with the mold table 36. Various types of shapes of molds 40 may be placed in opening 30 such that the shape of the concrete product being formed can be varied. However, each mold 40 usually is of the type for producing a slatted concrete floor panel and includes a plurality of laterally extending beams 42 separated by spaces 44. Only one beam 42 of the mold is shown in FIG. 6. The spaces 44 will be filled with concrete and will correspond to the slats of the floor panels with the beams 42 serving to define the spacing between the slats. When the mold 40 is coupled in the opening 39 in the mold table 36, the top surface of the beams 42 is coplanar with the top surface of the mold table 36.

Mold table 36 is provided with any suitable power means, such as the opposed hydraulic cylinders 45, for moving the mold table vertically relative to the support rods 34. As shown in FIG. 2, the mold table 36 is in a lower position in which the mold 40 contained in the table is in contact with the pallet 2. In this position, the mold table 36 is vertically aligned with an offset table section generally indicated as 46. Table section 46 is laterally offset from mold table 36 and serves as a support member for a laterally movable concrete dispensing hopper generally indicated as 48. (See FIG. 3) Positioned above the dispensing hopper 48 is a concrete fill hopper 50. The fill hopper 50 is fixedly contained on some support beams 52 which form part of the exterior frame 12. Fill hopper 50 may be charged with wet concrete and is provided with an openable valve 54. When the valve 54 is open, fill hopper 50 dispenses a load of concrete down into the dispensing hopper 48.

Figure 5:
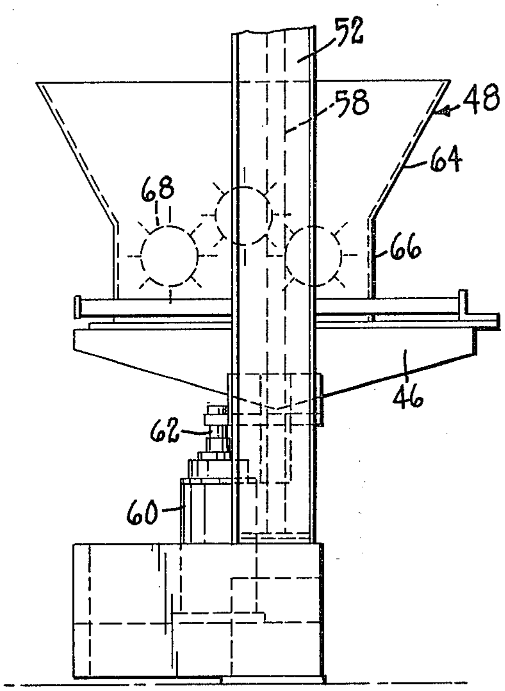
FIG. 5 is a side elevational view of the concrete dispensing hopper shown in FIG. 3.

Referring now to FIGS. 3 and 5, the table section 46 which carries the dispensing hopper 48 is slidably journaled by bearing 56 on two vertical support rods 58. Support rods 58 run along the beams 52. A hydraulic cylinder 60 is located beneath the table section 46. The piston rod 62 of cylinder 60 is connected to the table 46 for moving the table up and down the length of the support rods 58. This allows the vertical height of the table section 46 to be precisely matched with the vertical height of the top surface of the mold table 36. In other words, table section 46 has to match the height of the mold table 36 because the dispensing hopper 48 will move from one to the other during the course of its operation as described hereafter.

Dispensing hopper 48 is shown in FIG. 5 as having an upper funnel shaped section 64 and a lower rectangular section 66. A plurality of rotating paddle wheels or any other sutiable agitators, which are illustrated as 68 in FIG. 5, may be contained in the hopper 48 for agitating the concrete therein. The hopper 48 is movably mounted on both the table section 46 and the mold table 36 by opposed roller support pairs indicated as 70. Each roller support pair 70 includes two vertically spaced rollers 72 and 74. Rollers 72 and 74 are spaced apart a distance equal to the thickness of the peripheral edge of the table section 46 and the mold table 36. In addition, the rollers 72 and 74 are connected to a bracket 76 for attachment to one of the sides of the hopper 48. The lower support roller 74 in each pair 70 preferably comprises a toothed pinion or gear. This gear 74 suitably engages with a rack located on the under surface of the table section 46 and the mold table 36. A suitable drive motor (not shown) may be coupled to this pinion for causing reciprocation of the dispensing hopper 48 along the mold table 36. Alternatively, lower roller 74 could comprise a simple roller in which case a different type of drive system would be needed for causing the dispensing hopper 48 to move from the table section 46, onto the mold table 36, and then along the mold table 36 in forward and reverse directions.

As shown in FIGS. 1 and 2, the platen or press head comprises a first frame member 80. Frame member 80 has two transversely extending wings 82 each of which includes two arms 84. The arms 84 have outwardly extending brackets 86 each of which is journaled around one of the support rods 34. Located beneath the frame member 80 is a mold box which is generally indicated as 88. The mold box is a structure which corresponds to the shape or orientation of the grooves 44 in the mold 40. As shown in FIG. 2, mold box 88 can comprise a plurality of channel sections 90 which are attached to the underside of the first frame member 80 of the press head or platen. The orientation of the channel members 90 corresponds to the grooves 44 located in the mold 40 to allow the mold box 88 to enter into the mold 40 and contact and compact the concrete held therein. Obviously, the shape of the mold box 88 changes whenever the shape of the mold 40 is changed to allow the two components to interfit together.

Three hydraulic cylinders generally indicated as 100 are mounted on the cross beam 20. Each cylinder 100 has a piston rod 102 thereof extending downwardly for connection to the frame member 80 of platen 38 along the center line thereof. Together, the cylinders 100 serve to move the platen 38 into and out of engagement with the mold 40 in the mold table 36. As shown in FIG. 2, the platen 38 is in an intermediate position between its lower position where it contacts the mold 40 and an upper raised position where it is drawn up close to the cross beam 20.

Referring now to FIG. 4, a means for locking the platen 38 in its upper raised position is generally indicated as 104. The locking means 104 includes a locking bar 106 which is mounted to the frame member 80 of the platen 38 adjacent the connection of the central pivot rod 102. In addition, the locking means 104 includes a pivotably mounted locking hook 108. Locking hook 108 is pivotably mounted beneath the cross beam 20 by a shaft 109 pivotably carried in two ears 110. In addition, the upper end 112 of the locking hook 108 extends upwardly into the interior of the cross beam 20. The upper end 112 of locking hook 108 is pivotably connected at 114 to the piston rod 116 of a hydraulic or pneumatic cylinder 118. Cylinder 118 is contained inside the cross beam 20.

In addition, the locking means 104 for the platen 38 further includes a lock spring generally indicated as 120. Lock spring 120 includes a cylinder or frame 122 having a cylindrical interior bore 124. A locking pin 126 is slidable in the bore 124 and is normally biased by a spring 128 outwardly therefrom. Spring 128 in fact biases locking pin 126 into engagement with the outer end of the piston rod 116. An adjusting screw 130 is used for adjusting the tension on the spring 128. Spring 128 thus constantly biases the locking pin 126 into engagement with the piston rod 116 for a purpose to be described hereafter.

Referring now to FIGS. 1, 2, and 6, the platen 38 further includes a plurality of air cylinders which are generally indicated as 140. Each air cylinder 140 is mounted on the frame member 80 of the platen 38 by a bracket 142. Each air cylinder 140 further includes elongated piston rod 144 which extends downwardly therefrom through the frame member 80 of the platen 38 and through the open spaces in the mold box 88, i.e. between the channel members 90. The purpose of the piston rods 144 is to bear against the top of one of the beams 42 in the mold 40 to hold the mold down during the process by which the concrete products are formed. The air cylinders 140 can be coupled by conduits 146 to any suitable source of air pressure or the like.

Referring now to the operation of the concrete forming machine 10, initially both the mold table 36 and the platen 38 are located in an upper vertical position spaced from support frame 24. A pallet 2 is brought into engagement with the support frame defined by the frame sections 26–28. Any suitable conveyor may be used to bring the pallet into engagement with this support frame. After the pallet is so located, the mold table 36 is lowered until the bottom section of the mold table 36 contacts the pallet 2 around the periphery thereof. The mold 40 which is contained in the center of the mold table 36 is then located on top of the pallet 2. If desired, the reinforcing bars of the array 9 will be located in the grooves 44 of the mold 40 when the mold table 36 is lowered onto the pallet 2.

With the mold table 36 on top of the pallet 2, the concrete dispensing hopper 48 is reciprocated from table section 46 across the mold table 36. During this movement the hopper 48 is used to dispense concrete into the mold 40 in the mold table 36 through an openable outlet opening in the bottom of hopper 48. After one dispensing pass of hopper 48, the platen or press head 38 is lowered downwardly into engagement with the mold 40. In this regard, the mold box 88 of the platen 38 enters into the grooves 44 of the mold 40 to firmly contact and engage the concrete. Simultaneously with the downward pressure exerted by the platen 38 by virtue of the hydraulic pressure of the cylinders 60, the frame sections 26-28 of support frame 20 are vibrated. The combination of the pressure exerted by the platen 38 and the vibration of the frame sections 26-28 causes the concrete to compact and bind inside the mold 40.

when the press head or platen 38 is contacting the mold 40 in the compaction process, the air cylinders 140 are also simultaneously activated. This forces the piston rods 144 down into engagement with the top surfaces of selected beams 42 in the mold 40. This engagement prevents the mold 40 from tending to rise or climb upwardly out of the opening 38 in the mold table 36. Without the air cylinders 140, Applicant has found that the mold 40 has a tendency to rise during the compaction and vibration process. Any movement of the mold 40 is obviously undesirable since it contributes to a lessening of the binding process of the concrete. With the air cylinders 140, however, the mold 40 is firmly forced down into engagement with pallet 2. Thus, the air cylinders 140 serve as means for holding the mold 40 down in engagement with the pallet 2 during the concrete forming process. This yields a superior and enhanced concrete product.

After the concrete has been compacted in a first operation, it will usually be necessary for the hopper 48 to make another dispensing pass across the mold table 36. After this pass, the platen 38 is again lowered and another compacting operation as described above is completed. After the mold has been thoroughly filled with compacted concrete (it usually takes two such passes of the hopper 48 for this to occur), both the platen 38 and the mold table 36 can be raised. When the mold table is raised upwardly 36, it serves to strip the mold 40 from the pre-cast concrete product. This product will be retained on top of the pallet 2. Pallet 2 can then be moved out of the support frame 24 by any suitable means. One preferred means for such movement is the use of a slider frame which is part of the center frame section 24 of support frame 24. This slider frame engages one side of the pallet to push the pallet outwardly onto a plurality of roller conveyers. The pallet with the attached pre-cast product can then be moved to any desired location and stored to allow the product to thoroughly cure.

Each of the pallets 2 can be stored for a sufficient length of time until the pre-cast concrete product is thoroughly cured. The product can then be stripped from the pallet 2 and the pallet reused in the concrete forming process for making another product. The apparatus can, according to this invention, utilize a dry-cast concrete forming process. In other words, concrete which has very little water in the mix is used and the pressure from the platen 38 and the vibration of the support frame 24 mechanically binds the concrete together.

One important feature of this invention further relates to the drive system which is used for the dispensing hopper 48. As it noted previously, this drive system comprises a rack and pinion engagement which is located on the underside of both the table section 46 and the mold table 36. Note the location of the pinion 74. Thus, even though various bits of concrete may be thrown off during the concrete forming process, this concrete will not get into the rack of the pinion to thereby jam movement of the dispensing hopper 48.

In addition, it is sometimes necessary for workmen to come underneath the platen 38 to clean off the mold or the like or to perform any necessary operations on the mold. In this event, the hydraulic cylinders 100 are actuated until the platen 38 is located immediately beneath the cross beam 20. The hydraulic cylinder 118 is then actuated such that the locking hook 108 engages underneath the locking bar 106. This positively locks the platen 38 in an upper position and prevents the platen from falling downwardly to crush the workmen. The lock spring 120 is an additional safety feature. Because the locking pin 128 always bears against the piston rod 116 in a direction which will keep the locking hook 108 engaged with the bar 106, even if the hydraulic system should fail such that the cylinder 118 no longer has any hydraulic pressure the spring 128 is strong enough to keep the hook 108 engaged with the bar 106. Thus, lock spring 128 serves as an additional safety feature of this invention.

Various modifications of this invention will be apparent to those skilled in the art. Placement of the air cylinders 140 around the platen 38 can be adjusted as necessary with the number of cylinders used selected simply to prevent the mold from disengaging pallet 2 during the concrete forming process. Thus, the scope of this invention is to be limited only by the appended claims.

I claim:

1. An apparatus for forming concrete products on a substantially planar pallet of the type having a support frame for supporting the pallet in a substantially horizontal orientation; a vertically movable mold table defined by an enclosing peripheral wall and having a mold carried therein for forming the concrete product, wherein the mold includes a plurality of rigidly interconnected, laterally extending beams disposed within the wall to define a plurality of spaces between the beams and within the wall, the spaces normally being open at the top and bottom, wherein the mold table is movable into engagement with the pallet to engage the mold therewith and close the spaces at their bottoms, the pallet being located beneath the mold table to support the concrete product being formed; means for filling the mold in the mold table with uncured concrete; and a vertically movable platen for engaging and compacting the concrete placed into the mold, by entering the spaces at their tops, to form the concrete product; and wherein the improvement comprises:

means located on the platen for engaging and holding the mold down on the pallet during a concrete compaction process, wherein the mold holding means comprises a plurality of fluid cylinders fixedly located on the platen, wherein each cylinder has a reciprocal piston rod which extends downwardly through the platen and is movable relative to the cylinder and the platen for engaging various of the beams and forcing the mold in a downward direction, and further including means for simultaneously supplying a pressurized fluid to the cylinders for moving the piston rods downwardly to engage against the mold and force it against the pallet, and wherein the cylinders are of sufficient number and are spaced sufficiently far apart on the platen so as to hold the mold on the pallet without movement during the concrete compaction process.

* * * * *